Sept. 29, 1970     L. T. AKELEY     3,530,714

TARGET FLOWMETER

Filed Feb. 21, 1968     2 Sheets-Sheet 1

INVENTOR.
LLOYD T. AKELEY
BY
Lawrence H. Poeton
AGENT

United States Patent Office

3,530,714
Patented Sept. 29, 1970

3,530,714
TARGET FLOWMETER
Lloyd T. Akeley, Charlestown, N.H., assignor to The Foxboro Company, Foxboro, Mass., a corporation of Massachusetts
Filed Feb. 21, 1968, Ser. No. 707,058
Int. Cl. G01f 1/00; G01p 5/02
U.S. Cl. 73—228                                1 Claim

ABSTRACT OF THE DISCLOSURE

A flowmeter of the target meter type with an elbow-angled flow path in which the target is in the input angle leg and the force bar target support arm is in and along the other angle leg, providing a non-clogging long moment arm situation within the flow passage. A flush force bar pivot seal may be provided, and an option of straight through flow is disclosed.

---

This invention relates to flowmeters, in particular to flow rate meters in the form of head meters with primary elements of the type known as target meters, whose operation is based on differential pressure generated by the flow of fluid through a restriction. In the case of the target meter the restriction is an annular opening around the target as defined by the wall of the flow pipe with respect to the periphery of the target.

The target may be a disc usually centered in a flow pipe with the plane of the target right angled with respect to the direction of the fluid flow. The force acting on the target is measured directly rather than using a measurement of the differential fluid pressure. The pressure difference developed by fluid flow through the annular orifice produces a force on the target, proportional to the square of the flow rate. This force is carried out of the flow pipe through a target support arm passing through a pivot flexure seal in the flow pipe system and the force thus transmitted may be measured by pneumatic or electric force balance means.

Target meters require significant output forces to operate the usually available measurement equipment. This requires a substantial length factor in the target support arm between the target and the pivot, to provide a useful moment arm. This invention provides a moment arm of significant length and sufficient to use with small flow forces.

As an example embodying this invention, a target flowmeter may be provided such that the fluid flow is intercepted by the target in a horizontal plane, and the flow thereafter moves along a vertical plane and parallel to a force bar which is the support arm for the target. The flow then moves again in a horizontal plane away from the measuring unit. The force bar is flush flexure mounted through the wall of the flow pipe system at the beginning of the second horizontal flow. The force bar may also be mounted parallel and close to the upstream side wall of the vertical flow passage.

The flow of fluid continually sweeping lengthwise along the immersed force bar can prevent certain deposits from being established on the force bar, and with the wall-adjacent arrangement, most fluid flow simply passes the length of the force bar in the substantial pipe clearance thus provided with respect to the opposite wall of the pipe, and clogging is minimized. Thus error due to change in weight, bulk or opposition to movement of the force bar is minimized. Further, a considerable length of force bar, providing a significant moment arm, may be used. The fluid seal pivot of the force bar is well away from the target and yet may still be flush with the inner wall of the flow pipe system. This provides force bar moment arms greater in length than the diameter of the flow pipe while maintaining the advantages of flush mounting, such as non-clogging.

This invention lends itself to usefulness, for example, in small pipe size target meters, achieving essentially flush-seal situations and producing significant torque.

In the system of this invention, a choice of flow paths is provided by an exit opening, plugged when not in use, which is a straight line continuation of the input fluid flow path past the target. Prior to use, the parallel exit pipe and the inline plug may be interchanged to provide the zig-zag double-elbow flow path described above, or a direct flow path, as desired.

If the flow is a fluid that coagulates when cooled or that has entrained particles which solidify in dead-flow areas, the zig-zag flow path is preferable, with the fluid kept moving along the length of the force bar and past the flush seal mounting of the force bar. If the flow is with a no-problem fluid, the parts may be interchanged so that the flow goes straight through the system.

Other objects and advantages of this invention will be in part apparent and in part pointed out hereinafter and in the accompanying drawings, wherein.

Figure 1:
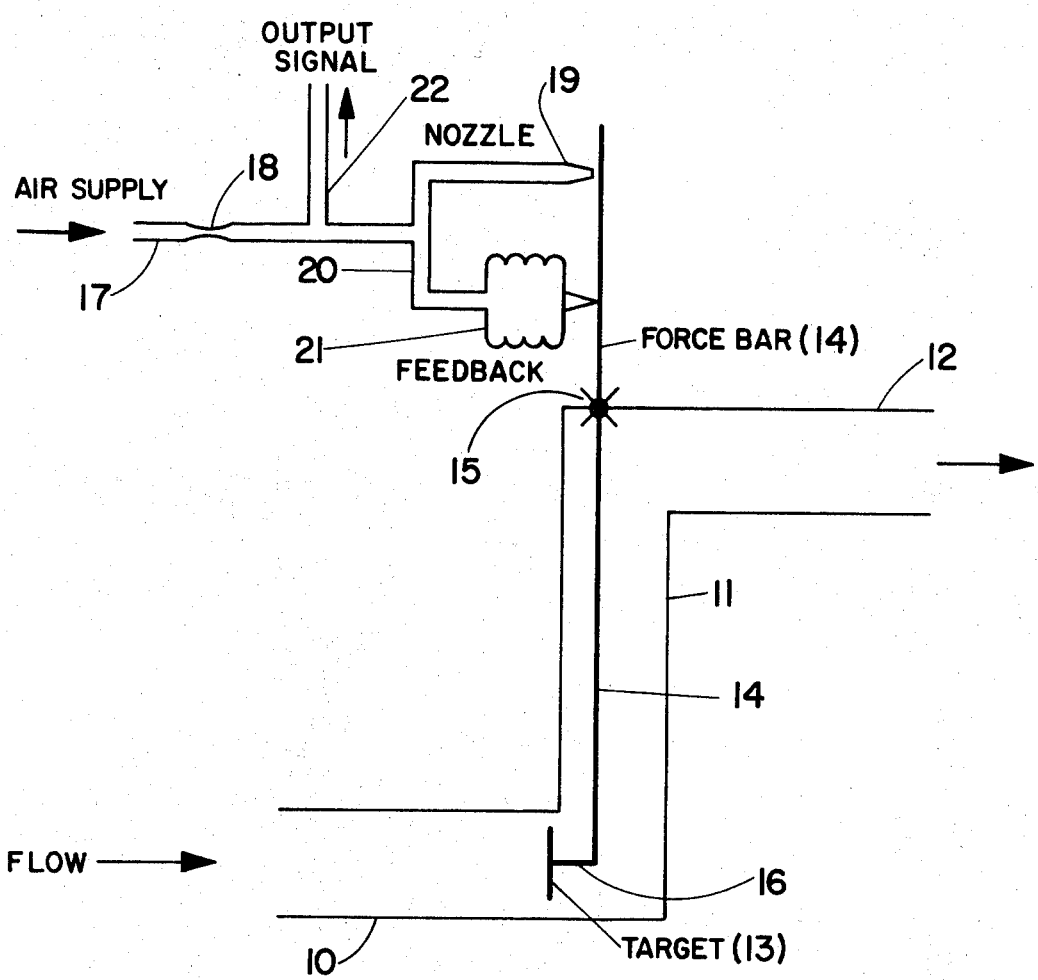
FIG. 1 is a schematic illustration of one form of target meter and system according to this invention.
Figure 2:
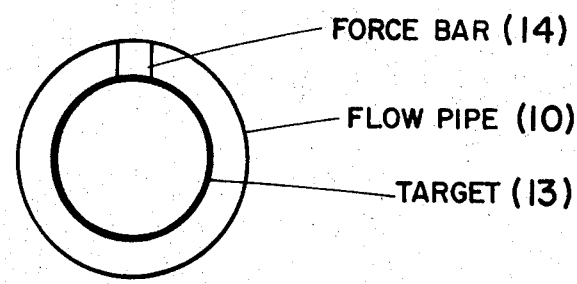
FIG. 2 is a head-on view of the target of FIG. 1.
Figure 3:
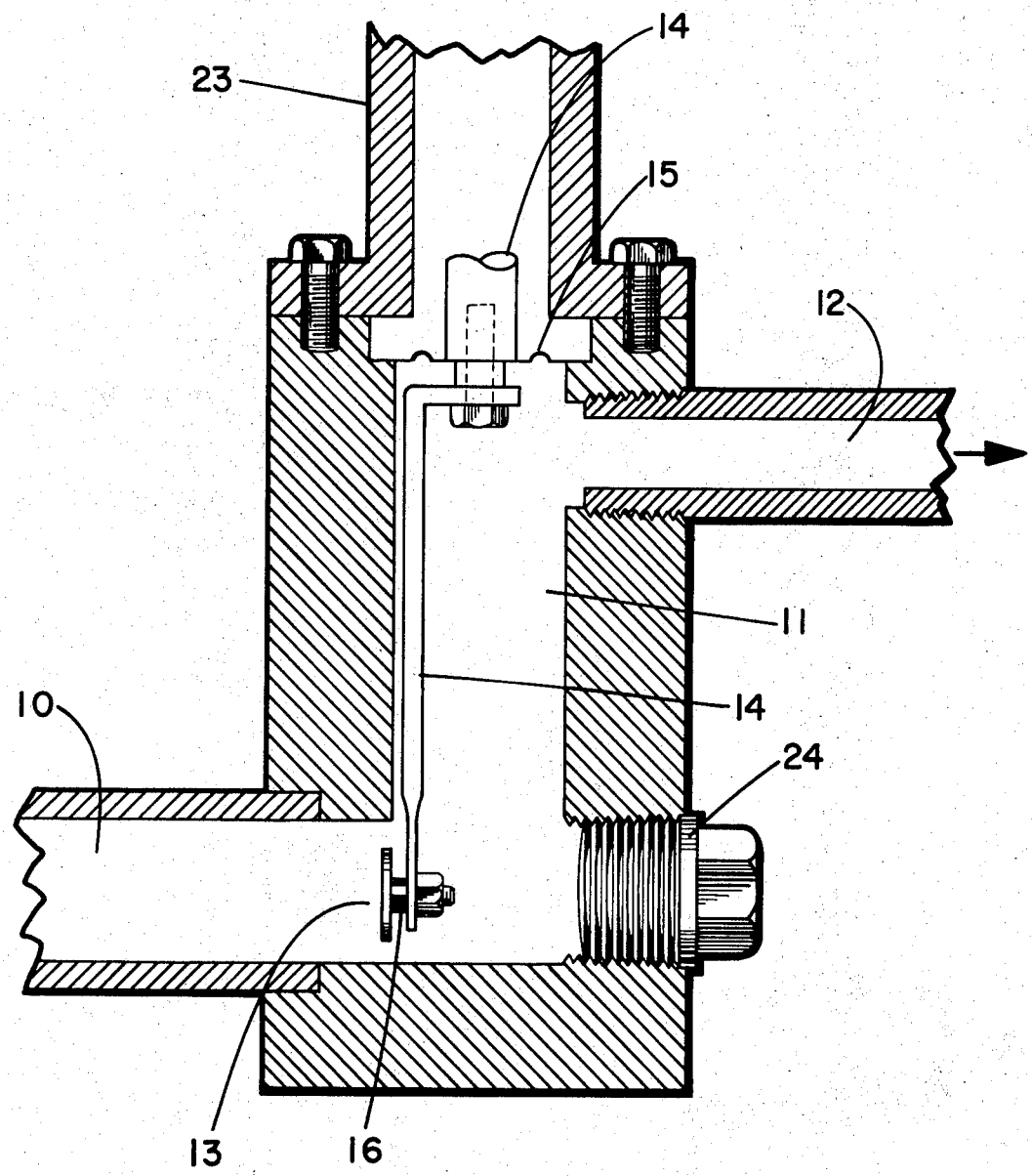
FIG. 3 is an illustration of the target meter of FIG. 1, in more detail, and with the additional feature of straight through flow option.

The illustrative embodiment of this invention which is shown in the drawings is presented in FIGS. 1 through 3, with like reference numerals applied to like elements in the different figures.

In the FIG. 1 flowmeter target meter system, a flow path for fluid to be measured is provided, in flow passage end-to-end series, by an input flow pipe 10, a target body passage 11, at right angles to the input pipe 10, and an output flow pipe 12, parallel to the input pipe 10.

The input and output pipes 10 and 12 may be horizontal and the target body passage vertical. Thus a jogged, or zig-zag flow passage is provided for the fluid flow to be measured. A factor of significant importance is that the target body passage 11 be at a substantial angle with respect to the input passage 10. The input and output passages may be varied from the horizontal and from parallelism, and the target body passage 11 may be varied from perpendicularity, and may be other than at a right angle with respect to the input pipe, according to the needs of different mounting or process applications.

The target system comprises a target 13, a target force arm 14, which is the support arm for the target 13 and a flexure mounting 15 usually a diaphragm, sealed in the upper end of the target body 11, so that the target force arm extends through the pipe wall of the flow path to transmit the force on and/or motion of the target 13 to the outside of the flow passage.

The target 13 is ordinarily a disk located in the downstream end of the input pipe 10, concentric with and transversely of the input pipe so as to face the fluid flow therein. The inside diameter of the target disk 13 is less than that of the input pipe 10 by an amount sufficient to provide an annular orifice between the target periphery and the inner wall of the input pipe. The differential pressures established with respect to the annular orifice result in a force on the target 13 tending to move it downstream, in representation of the flow rate of the fluid being measured. Various other target shapes and forms may be used as desired for particular applications or systems.

The target 13 is mounted on the lower end of the target force arm 14 by a mounting stud 16 which may be provided with an adjustment screw for fine positioning or locating of the target.

The target force arm 14 is a straight bar, extending lengthwise of the target body passage 11, from the target stud 16 to and through the flexure mounting 15 therefor. The force arm 14 is preferably located close to and along the upstream side of the target body passage 11. Accordingly, the fluid flow continually washes along the length of the force arm, preventing deposits thereon and a substantial clearance is provided between the force arm and the downstream side of the target body passage 11. The flexure 15 is essentially flush mounted with respect to the flow passage.

These factors all contribute significant improvement to target flowmeter measurement, especially of difficult fluids, such as those containing matter liable to deposit out, for example, when temperatures are lowered: Thus, no special heating devices are needed in most applications.

Further in FIG. 1, a signal output system is shown as one example. It is pneumatic, with an air supply into an input pipe 17 through a restrictor 18 to a nozzle 19 adjacent the force arm 14 in a nozzle-baffle relationship. Feedback means is provided from the nozzle 19 through a feedback pipe 20 to a rebalancing bellows 21 which is applied to the force bar 14, with an output signal at 22. Similarly operating output systems may also be used, such as those using electrical strain gauges or solenoid coils, as desired.

FIG. 3 shows the structure of the system in some further detail, including the mounting detail of the force arm 14 structure through the flexure diaphragm 15 and the indication of a top works isolation housing 23, which may be developed to any suitable form for containing part or all of the output system.

For some not-difficult fluids, it may be useful to establish straight through flow in the target meter system. For this purpose, a plug 24 is provided at the lower end of the target body, and this plug is interchangeable with the output pipe 12, prior to operation, to accommodate such situations.

The location of the target arm 14 from a point of concentricity and parallelism in the target body passage 11 to the situation shown in FIGS. 1 and 2 may be varied according to the application, to most desirably produce a minimum of error producing deposits, and/or undesirable torque on the target arm by the fluid flow, in either downstream or back pressure directions.

The general shape of the flow path may be altered to produce softer, rounded form and corners when such alteration results in lessening of undesirable turbulences.

This invention therefore provides a new and useful target flow meter with unique structure resulting in significant improvement in measurement, particularly with respect to systems of small flows.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A target flowmeter device wherein fluid flow is measured through an elongate force bar extending through a flexible mounting in a wall of said device, without narrow, deposit inducing areas outside the main flow stream of the device, and with said force bar lying, within the main flow stream of the device, lengthwise of the flow stream and in a minimal deposit inducing location along and adjacent one side of the flow stream, said device comprising a vertical body with an elongate, vertical flow passage therethrough, a horizontal, essentially flat plane flexible diaphragm mounted as the top end wall of said body passage, a long portion of said force bar lying in said vertical flow passage and adjacent one wall portion thereof, a horizontal input pipe to the lower end of said vertical body passage, through the wall portion of said vertical passage to which said long portion of said force bar is adjacent, a horizontal output pipe from the upper end of said vertical target body passage, through the wall portion of said vertical passage which is opposite to that to which said long portion of said force bar is adjacent, whereby fluid flow through said device is lengthwise of said long portion of said force bar and for the most part on one side of said force bar, a vertically disposed target in said input pipe and secured to the lower end of said force bar, and an angled top end of said long portion of said force bar, secured to the center of said flexible diaphragm adjacent the top level of said output pipe, in an open arrangement without flow deposit inducing areas.

References Cited

UNITED STATES PATENTS

| 2,742,784 | 4/1956 | Brous | 73—228 |
| 3,293,913 | 12/1966 | Hannon | 73—228 |

RICHARD C. QUEISSER, Primary Examiner

J. K. LUNSFORD, Assistant Examiner